(12) United States Patent
Velkey et al.

(10) Patent No.: US 11,531,890 B2
(45) Date of Patent: Dec. 20, 2022

(54) PADDING METHOD FOR A CONVOLUTIONAL NEURAL NETWORK

(71) Applicant: Robert Bosch GmbH, Stuttgart (DE)

(72) Inventors: Geza Velkey, Ipolyszog (HU); Kornel Istvan Kis, Tapolca (HU); Peter Korosi-Szabo, Budapest (HU)

(73) Assignee: Robert Bosch GmbH, Stuttgart (DE)

(*) Notice: Subject to any disclaimer, the term of this patent is extended or adjusted under 35 U.S.C. 154(b) by 387 days.

(21) Appl. No.: 16/808,672

(22) Filed: Mar. 4, 2020

(65) Prior Publication Data

US 2020/0285963 A1 Sep. 10, 2020

(30) Foreign Application Priority Data

Mar. 6, 2019 (DE) .......................... 102019203024.6

(51) Int. Cl.
*G06N 3/08* (2006.01)
*G05D 1/02* (2020.01)
*G05D 1/00* (2006.01)
*G06V 20/10* (2022.01)

(52) U.S. Cl.
CPC ............. *G06N 3/08* (2013.01); *G05D 1/0088* (2013.01); *G05D 1/0246* (2013.01); *G06V 20/10* (2022.01); *G05D 2201/0203* (2013.01); *G05D 2201/0208* (2013.01)

(58) Field of Classification Search
CPC ........ G06N 3/08; G06N 3/0454; G06N 3/063; G05D 1/0088; G05D 1/0246; G05D 2201/0203; G05D 2201/0208; G06V 20/10; G06V 10/82; G06K 9/6273; G06T 1/60; G06T 1/20
See application file for complete search history.

(56) References Cited

U.S. PATENT DOCUMENTS

| 10,646,288 | B2 * | 5/2020 | Yeung | ................. A61B 1/00009 |
| 2018/0218497 | A1 * | 8/2018 | Golden | .................... G06T 7/143 |
| 2020/0143206 | A1 * | 5/2020 | Kartal | ..................... G06N 3/006 |

* cited by examiner

*Primary Examiner* — Thomas Ingram
(74) *Attorney, Agent, or Firm* — Norton Rose Fulbright US LLP; Gerard Messina

(57) ABSTRACT

A padding method for a convolutional neural network, in particular for concentrically configured data. The method includes receiving concentrically configured data of an object, the concentrically configured data correlating with an image, which was recorded concentrically to the object, deconvolving the concentrically configured data to form a data array, including real-coherent data on opposite sides of the data array, carrying out a convolution operation by using ring padding, in the case of ring padding, the real-coherent data of one side of the data array being utilized for padding the real-coherent data of a side of the data array opposite thereto, and/or vice versa.

11 Claims, 5 Drawing Sheets

Fig. 2a
Fig. 2b
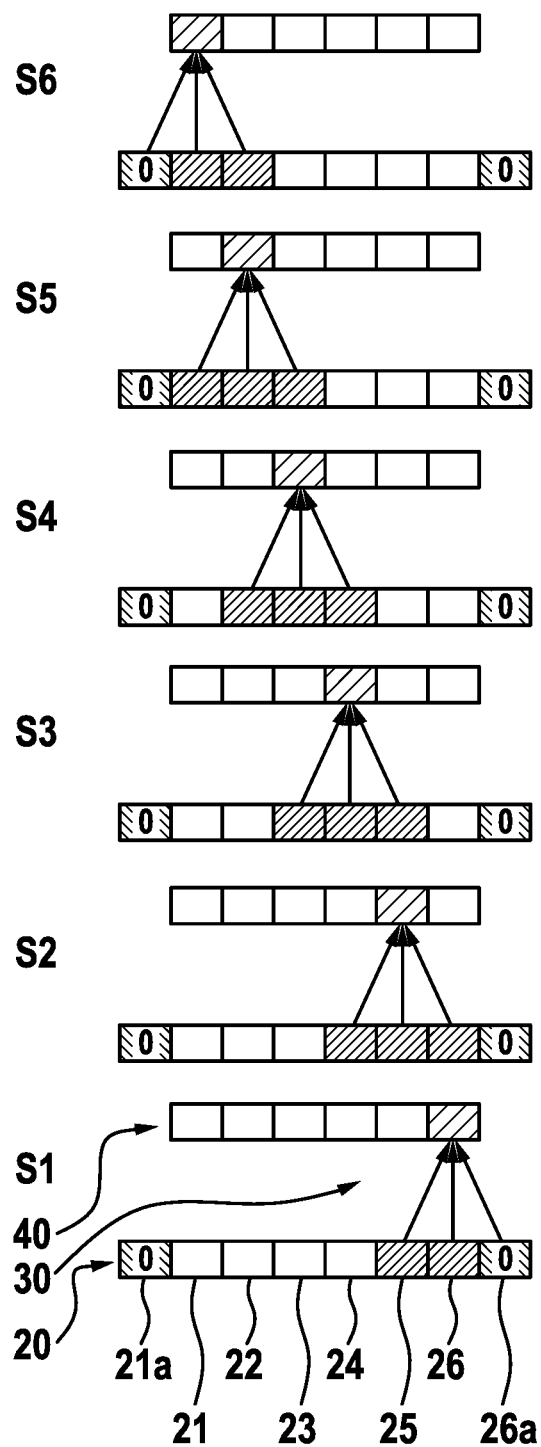
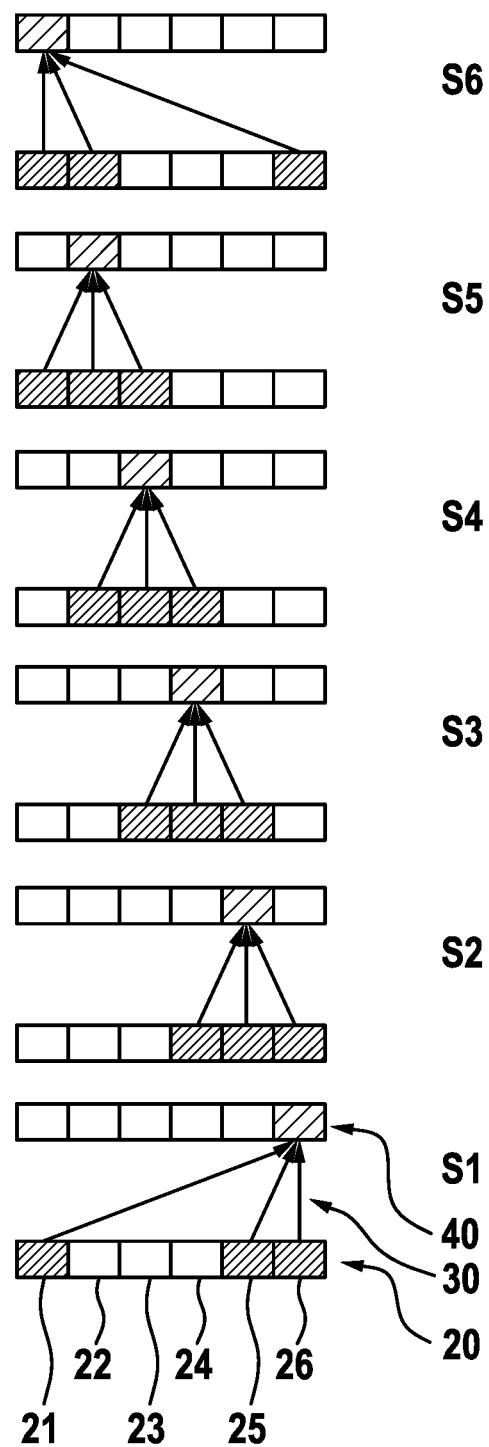

PADDING METHOD FOR A CONVOLUTIONAL NEURAL NETWORK

CROSS REFERENCE

The present application claims the benefit under 35 U.S.C. § 119 of German Patent Application No. DE 102019203024.6 filed on Mar. 6, 2019, which is expressly incorporated herein by reference in its entirety.

FIELD

The present invention relates to a padding method for a convolutional neural network, a device, a computer program, and a machine-readable memory medium.

BACKGROUND INFORMATION

Convolutional neural networks, also called convolving neural networks, are considered to be one of the most efficient tools for image processing or video processing.

With respect to the control of at least semi-autonomous robots, in particular vehicles traveling in an at least partially automated manner, image data and other physical observations from the robot surroundings are an important information source. Artificial neural networks, such as convolutional neural networks, are utilized in order to classify, on the basis of these very high-dimensional data, which objects are present in the robot surroundings.

Modern convolutional neural networks include various layers, so-called convolutional layers. Via a discrete convolution with the aid of a filter kernel, which essentially corresponds to a convolution matrix, an output data array is generated from an input data array, for example, image data, of a convolutional layer. Since the filter kernel itself usually has multiple dimensions, the output data array has a smaller dimension than the input data array. When multiple convolutional layers are applied onto an input data array, its dimension therefore constantly decreases.

Such convolutional neural networks therefore usually include a so-called padding mechanism, in order to ensure that the input data array and the output data array of the convolutional neural network are numerically compatible, i.e., in particular, have the same dimensions.

So-called zero padding is primarily for this purpose, in the case of which the input data array is expanded at its edges by precisely the dimension of data, by which it is reduced upon the application of the filter kernel. The data utilized for this purpose are simple zeros in this case.

If the input data array displays a piece of ring-shaped surroundings information, however, which is the case, for example, with respect to at least semi-autonomous robots, the conventional padding methods offer no possibilities for handling, in particular, such a type of input data.

There is a desire, therefore, to provide an improved padding method for a convolutional neural network, in particular for concentrically configured data.

SUMMARY

According to one aspect of the present invention, an example padding method for a convolutional neural network includes the steps:

receiving concentrically configured data of an object, the concentrically configured data correlating with an image, which was recorded concentrically to the object;

deconvolving the concentrically configured data to form a data array, including real-coherent data on opposite sides of the data array;

carrying out a convolution operation by using ring padding, in the case of ring padding, the real-coherent data of one side of the data array being utilized for padding the real-coherent data of a side of the data array opposite thereto, and/or vice versa.

The term "concentrically configured data" encompasses data, which are detected concentrically around an object. Preferably, such data are also referred to as ring data or ring-shaped data.

The term "convolutional neural network" is preferably also described by the term "convolving neural network".

The term "real-coherent data" encompasses data, in particular pieces of surroundings data, which are situated next to one another in reality.

The term "convolutional layer" is also described by the term "convolving layer". The convolutional neural network includes various convolutional layers. Each convolutional layer includes a data array, upon which a convolution operation is applied with the aid of a filter kernel. The output data of the convolution operation determine a further data array, preferably a further convolutional layer. In this way, the original data array may be processed with the aid of multiple consecutive convolutional layers. Preferably, the unprocessed data array of a convolutional layer is designated as an input data array and the data array generated with the aid of the convolution operation is designated as an output data array. The output data array of one convolutional layer preferably corresponds to the input data array of a further convolutional layer.

Concentrically configured data are distinguished primarily by the fact that they are continuously linked to each other in one direction. If, for example, as in the case of automated driving, the entire surroundings of an object are detected, concentrically configured data arise. This may be visualized, for example, as a hollow cylinder. In the circumferential direction of the hollow cylinder, therefore, all data are surrounded by further data.

If the data correlate, for example, with an image, which was recorded concentrically around the object, the data, which have arisen as a result, may be visualized in the form of a hollow cylinder. In the case of such hollow cylindrical data, the hollow cylinder is opened and "unrolled" at one longitudinal side upon deconvolution. The data array, which has arisen as a result, therefore encompasses real-coherent data on two opposite sides of the data array. Although these real-coherent data display pieces of data situated next to one another in reality, in the data array, however, they are situated on opposite sides.

Of course, concentrically configured data going beyond this example are possible.

In this way, noise, which is added to the concentrically configured data in the case of conventional padding methods, is eliminated. In addition, real-coherent data may therefore be added with respect to one another.

The filter kernel is applied onto real data and onto data, which are added via the padding method. In this way, although the dimension of the data array is not reduced in any convolutional layer, noise is introduced into the information flow of the data. In contrast to typical padding methods, the convolutional neural network needs considerably fewer convolutional layers, in order to again eliminate the noise. In this way, fewer deep architectures or models of the convolutional neural network may be utilized.

In addition, an automatic anti-noise process, which must be learned by the convolutional neural network, in order to eliminate the noise, introduces an unnecessary complexity and, therefore, wastes network capacities of the convolutional neural network. Due to the ring padding, this problem may be eliminated, whereby smaller, faster, and less complex models of the convolutional neural network are possible.

According to one preferred embodiment of the present invention, the data array encompasses real-non-coherent data on opposite sides of the data array, the method further including:

padding the real-non-coherent data of the data array with the aid of conventional padding methods, preferably constant padding, zero padding, or reflection padding.

Preferably, a described ring padding is not necessary in the case of real-non-coherent data.

According to one preferred embodiment of the present invention, the data array includes a left end and a right end, each of which encompasses the real-coherent data, the method further including:

padding the real-coherent data of the left end of the data array with the real-coherent data of the right end of the data array and/or vice versa.

According to one preferred embodiment of the present invention, the data array includes an upper end and a lower end, each of which encompasses the real-non-coherent data, the method further including:

padding the real-non-coherent data of the upper end and of the lower end of the data array with the aid of conventional padding methods, preferably constant padding, zero padding, or reflection padding.

According to one preferred embodiment of the present invention, the data array has an arbitrary number of dimensions.

Usually, the data array, which correlates with an image, has one or two dimensions. Further dimensions are also possible, however.

According to one preferred embodiment of the present invention, the dimension of the ring padding depends on the dimension of a filter kernel utilized for the convolution operation.

The larger the filter kernel is dimensioned, the larger must the ring padding also be dimensioned. The number of the real-coherent data added via the ring padding on the side at which ring padding is carried out preferably depends on the dimension of the utilized filter kernel and, therefore, on the reduction of the data array with the aid of the convolution operation.

According to one preferred embodiment of the present invention, the padding method further includes:

learning the relationship between real-coherent data of opposite sides of the data array within one convolutional layer of the convolutional neural network.

When concentrically configured data are deconvolved to form non-ring-shaped data, two ends of these data are situated far apart from one another, although, in reality, they are situated closely next to one another. In typical padding methods, the convolutional neural network must learn the relationship between real-coherent data from opposite sides of the data array. A deep architecture of the convolutional neural network is needed for this purpose, in order to have the pieces of information therefor. Due to the ring padding, the relationship between real-coherent data of opposite sides of the data array within one convolutional layer of the convolutional neural network may be learned.

According to one further aspect of the present invention, an example device is configured for implementing a padding method of the type described herein.

One further aspect of the present invention includes an example control method for an at least semi-autonomous robot, including the steps:

receiving surroundings data of the at least semi-autonomous robot, the surroundings data encompassing concentrically configured data, which correlate with an image, which was recorded concentrically to the at least semi-autonomous robot;

applying an image recognition onto the recorded image by implementing a padding method of the type described herein; and controlling the at least semi-autonomous robot depending on the image recognition applied onto the recorded image.

In this way, an at least semi-autonomous robot may be controlled in an improved way based on received surroundings data.

In general, the, in particular, at least semi-autonomous, robot may be a vehicle traveling in an at least partially automated manner. Alternatively, the at least semi-autonomous robot may also be another mobile robot, for example, such a robot, which moves by flying, swimming, diving, or walking. The mobile robot may also be, for example, an at least semi-autonomous lawn mower or an at least semi-autonomous cleaning robot, or the like.

According to one further aspect of the present invention, an example computer program encompasses commands, which, upon execution of the computer program by a computer, prompt the computer to implement a method of the type described herein.

According to one further aspect of the present invention, the computer program of the type described herein is stored on a machine-readable memory medium.

Further measures improving the present invention are represented in greater detail below together with the description of the preferred exemplary embodiments of the present invention with reference to figures.

DETAILED DESCRIPTION OF EXAMPLE EMBODIMENTS

FIG. 2a shows a schematic representation of the zero padding onto a data array.

FIG. 2b shows a schematic representation of the ring padding onto a data array.

DETAILED DESCRIPTION OF EXAMPLE EMBODIMENTS

Figure 1A:
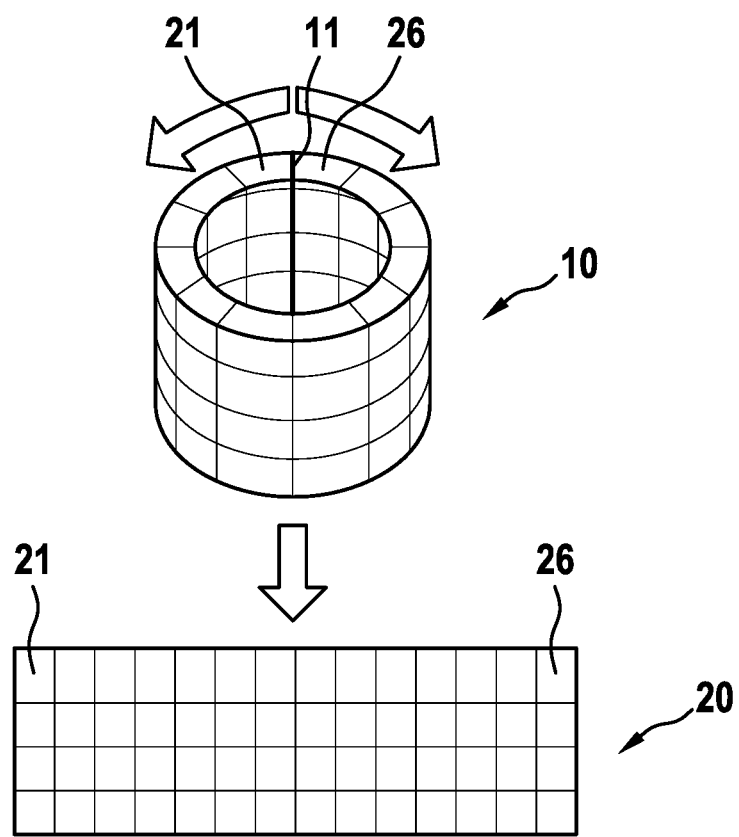
FIG. 1a shows, two-dimensionally, concentrically configured data, which are deconvolved to form a data array.

FIG. 1a shows two-dimensional, concentrically configured data 10. For example, concentrically configured data 10 correlate to surroundings data, which were recorded concentrically to an object, in particular a vehicle traveling at least semi-automatedly. In order to process concentrically configured data 10, these must be deconvolved. Concentrically configured data 10 have, as shown in FIG. 1a, the shape of a hollow cylinder, in the center of which the aforementioned object was situated.

In order to deconvolve concentrically configured data 10, these are separated at a separation point 11 and deconvolved to form a data array 20. In this way, real-coherent data 21, 26, which were situated at separation point 11, are situated at two opposite sides of data array 20.

Figure 1B:
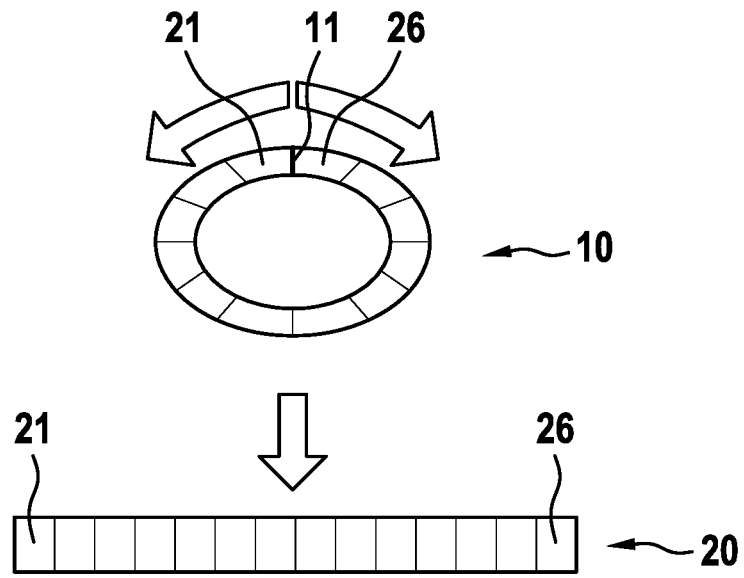
FIG. 1b shows, one-dimensionally, concentrically configured data, which are deconvolved to form a data array.

FIG. 1b shows one-dimensional, concentrically configured data 10. The deconvolution of such concentrically configured data 10 corresponds to the comments presented with respect to the two-dimensionally concentrically configured data 10 from FIG. 1a.

FIG. 2a and FIG. 2b show a schematic representation of a convolution operation by using zero padding in FIG. 2a and ring padding in FIG. 2b onto a data array 20, which is made up of concentrically configured data 10.

Data array 20 shown encompasses six data sets 21, 22, 23, 24, 25, 26, in particular, a first data set 21, a second data set 22, a third data set 23, a fourth data set 24, a fifth data set 25, and a sixth data set 26. A convolution operation is carried out onto data array 20 with the aid of a filter kernel 30. Filter kernel 30 has a dimension of three; this means, three data sets at a time are processed by filter kernel 30 and are discretely convolved to form one output data set of output array 40. This method is carried out, in steps, for as long as it takes to process entire data array 20. Due to the limitation of data array 20 at the edge areas, a convolution operation onto data array 20 without a type of padding method would result in a reduction of the dimension of data array 20. In the case shown, filter kernel 30 would process data array 20 in four steps. For this purpose, filter kernel 30 would, in a first step, implement the discrete convolution based on fourth data set 24, fifth data set 25, and sixth data set 26; in a second step, implement the discrete convolution based on third data set 23, fourth data set 24, and fifth data set 25; in a third step, implement the discrete convolution based on second data set 22, third data set 23, and fourth data set 24; and, in a fourth step, implement the discrete convolution based on first data set 21, second data set 22, and third data set 23. In this way, the dimension of data array 20 with respect to output array 40 would be reduced from six to four.

For this reason, data array 20 is usually artificially enlarged with the aid of a padding method; in this case, from six to eight, so that output array 40 still has a dimension of six after the convolution operation.

In the case of the zero padding in FIG. 2a, data array 20 is expanded, at its two ends, by a left zero data set 21a and a right zero data set 26a, each having the value zero. In step S1, filter kernel 30 implements the discrete convolution based on fifth data set 25, sixth data set 26, and right zero data set 26a. Filter kernel 30 processes data array 20 in steps S2 through S5 as described above, toward the left. In step S6, filter kernel 30 implements the discrete convolution based on left zero data set 21a, first data set 21, and second data set 22. In this way, output array 40 has one further dimension of six.

In the case of the ring padding in FIG. 2b, data array 20 is not artificially expanded. Instead, in step S1, filter kernel 30 implements the discrete convolution based on fifth data set 25, sixth data set 26, and first data set 21. Since data array 20 is made up of concentrically configured data 10, first data set 21 and sixth data set 26 are real-coherent data. In this way, the ring padding utilizes real data instead of zeros, in order to apply a padding method onto data array 20.

Filter kernel 30 processes data array 20 in steps S2 through S5 as described above, toward the left. In step S6, filter kernel 30 implements the discrete convolution based on sixth data set 26, first data set 21, and second data set 22. In this way, output array 40 has a dimension of six. In this way, the ring padding utilizes real data instead of zeros, in order to apply a padding method onto data array 20.

Figure 3A:
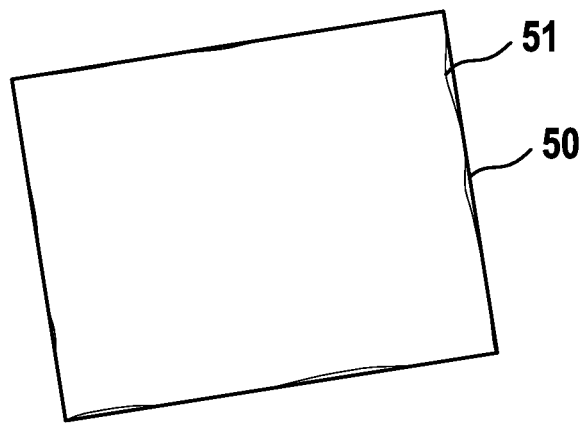
FIG. 3a shows zero padding applied onto a polygon.
Figure 3B:
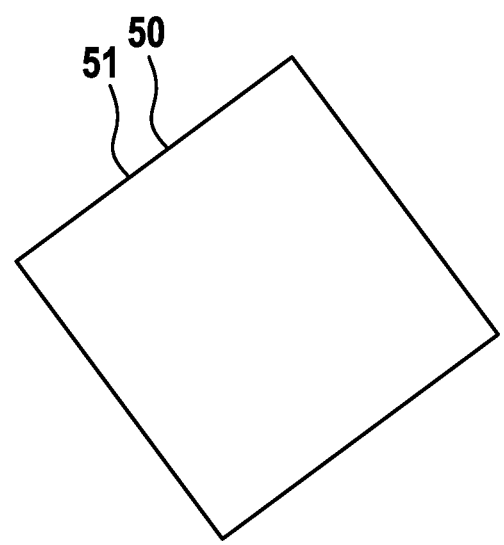
FIG. 3b shows ring padding applied onto a polygon.

FIGS. 3a and 3b show the difference between zero padding and ring padding, using the example of a polygon.

The results shown originate from a convolution autoencoder, which was given the task of reproducing a polygon, which is represented as a 1D array. Each polygon is made up of 360 numbers, which represent the distances to an origin in a polar coordinate system having a resolution of 360 degrees. Basic shape 50 represents the reality. Output shapes 51 each contain the learned values.

Output shape 51 shown in FIG. 3a was created with the aid of zero padding, while output shape 51 shown in FIG. 3b was created with the aid of ring padding. In FIG. 3a, it is clearly apparent which error the zero padding introduces into the system, since the additional data sets needed for the zero padding are described using zeros. By contrast, output shape 51 shown in FIG. 3b, which was learned with the aid of ring padding, is comparatively error-free.

Figure 4A:
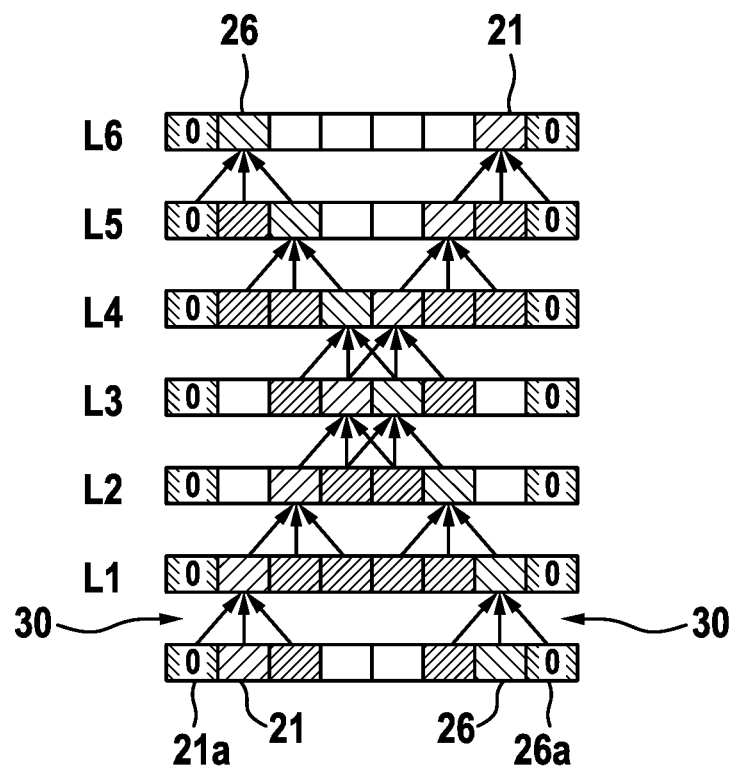
FIG. 4a shows a schematic representation of zero padding during the learning of the relationship between real-coherent data from opposite sides of a data array.
Figure 4B:
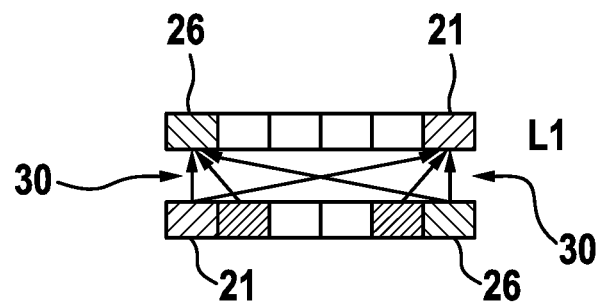
FIG. 4b shows a schematic representation of ring padding during the learning of the relationship between real-coherent data from opposite sides of a data array.

FIGS. 4a and 4b show the information flow of the data sets from the left side of data array 20 to the right side of data array 20, and vice versa.

The basic configuration of data arrays 20 corresponds to data arrays 20 shown in FIGS. 2a and 2b. FIG. 4a shows the application of the convolution operation with the aid of zero padding across multiple convolutional layers L1, L2, L3, L4, L5, L6. First data set 21 needs six convolutional layers L1, L2, L3, L4, L5, L6, in order to penetrate from the left side of data array 20 to the right side of data array 20. Only then may a relationship be established, with the aid of a learning algorithm, of first data set 21 with respect to sixth data set 26 and recognized that these are real-coherent data. The same applies, in reverse, for sixth data set 26, which also needs 6 convolutional layers L1, L2, L3, L4, L5, L6, in order to penetrate up to the left side of data array 20.

In contrast thereto, as shown in FIG. 4b, a relationship may be established, with the aid of a learning algorithm, of first data set 21 with respect to sixth data set 26 already after a first convolutional layer L1 and it may be recognized that these are real-coherent data.

Figure 5:
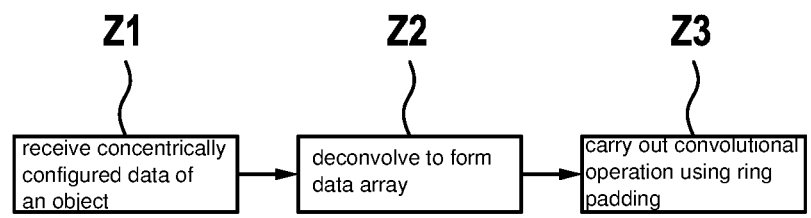
FIG. 5 shows a schematic representation of a padding method in a convolutional neural network.

FIG. 5 shows a schematic representation of a padding method in a convolutional neural network.

In step Z1, concentrically configured data of an object are received, the concentrically configured data correlating with an image, which was recorded concentrically to the object.

In step Z2, the concentrically configured data are deconvolved to form a data array, including real-coherent data on opposite sides of the data array.

In step Z3, a convolution operation is carried out by using ring padding, in the case of ring padding, the real-coherent data of one side of the data array being utilized for padding the real-coherent data of a side of the data array opposite thereto, and/or vice versa.

What is claimed is:

1. A device configured to control an at least semi-autonomous robot, the device configured to:

receive surroundings data of the at least semi-autonomous robot, the surroundings data encompassing concentrically configured data which correlate with an image which was recorded concentrically to the at least semi-autonomous robot;

apply an image recognition onto the recorded image including carrying out a padding method, the padding method including deconvolving the concentrically configured data to form a data array, including real-coherent data on opposite sides of the data array, and implementing a convolution operation by using ring padding, in the ring padding, the real-coherent data of one side of the data array being used for padding the real-coherent data of an opposite side of the data array; and control the at least semi-autonomous robot depending on the image recognition applied onto the recorded image.

2. A control method for an at least semi-autonomous robot, comprising the following steps:

receiving surroundings data of the at least semi-autonomous robot, the surroundings data encompassing concentrically configured data which correlate with an image which was recorded concentrically to the at least semi-autonomous robot;

applying an image recognition onto the recorded image including carrying out a padding method, the padding method including deconvolving the concentrically configured data to form a data array, including real-coherent data on opposite sides of the data array, and implementing a convolution operation by using ring padding, in the ring padding, the real-coherent data of one side of the data array being used for padding the real-coherent data of an opposite side of the data array; and controlling the at least semi-autonomous robot depending on the image recognition applied onto the recorded image.

3. The control method as recited in claim 2, wherein the real-coherent data of the opposite side of the data array being used for padding the real-coherent data of the one side of the data array.

4. The control method as recited in claim 2, wherein the data array includes real-non-coherent data on opposite sides of the data array, the method further comprising the following step:

padding the real-non-coherent data of the data array using constant padding, or zero padding, or reflection padding.

5. The control method as recited in claim 2, wherein the data array includes a left end and a right end, each of which encompasses the real-coherent data, the method further comprising the following step:

padding the real-coherent data of the left end of the data array with the real-coherent data of the right end of the data array.

6. The control method as recited in claim 5, further comprising:

padding the real-coherent data of the right end of the data array with the real-coherent data of the left end of the data array.

7. The control method as recited in claim 5, wherein the data array includes an upper end and a lower end, each of which encompasses the real-non-coherent data, the method further including the following step:

padding the real-non-coherent data of the upper end and of the lower end of the data array using constant padding, or zero padding, or reflection padding.

8. The control method as recited in claim 2, wherein the data array includes an arbitrary number of dimensions.

9. The control method as recited in claim 2, wherein a dimension of the ring padding depends on a dimension of a filter kernel used for the convolution operation.

10. The control method as recited in claim 2, further comprising the following step:

learning a relationship between real-coherent data of opposite ends of the data array within one convolutional layer of the convolutional neural network.

11. A non-transitory machine-readable memory medium on which is stored a computer program for performing a control method for an at least semi-autonomous robot, the computer program, when executed by a computer, causing the computer to perform:

receiving surroundings data of the at least semi-autonomous robot, the surroundings data encompassing concentrically configured data which correlate with an image which was recorded concentrically to the at least semi-autonomous robot;

applying an image recognition onto the recorded image including carrying out a padding method, the padding method including deconvolving the concentrically configured data to form a data array, including real-coherent data on opposite sides of the data array, and implementing a convolution operation by using ring padding, in the ring padding, the real-coherent data of one side of the data array being used for padding the real-coherent data of an opposite side of the data array; and controlling the at least semi-autonomous robot depending on the image recognition applied onto the recorded image.

* * * * *